United States Patent
Jacobson et al.

(10) Patent No.: US 7,815,690 B2
(45) Date of Patent: Oct. 19, 2010

(54) PERFLUOROAMIDATED AND HYDROLYZED MALEIC ANHYDRIDE COPOLYMERS

(75) Inventors: Stephen Ernest Jacobson, Hockessin, DE (US); Peter Michael Murphy, Chadds Ford, PA (US); Melea Rena Langley, Ringgold, GA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/620,773

(22) Filed: Nov. 18, 2009

(65) Prior Publication Data
US 2010/0068449 A1   Mar. 18, 2010

Related U.S. Application Data

(62) Division of application No. 11/115,533, filed on Apr. 27, 2005, now abandoned.

(51) Int. Cl.
*D06M 15/263* (2006.01)
*D06M 15/277* (2006.01)
*D06M 15/285* (2006.01)

(52) U.S. Cl. .................. 8/115.6; 427/299; 427/372.2; 428/96; 252/8.62

(58) Field of Classification Search .................. 8/115.6; 252/8.62; 427/299, 372.2; 428/96
See application file for complete search history.

(56) References Cited

U.S. PATENT DOCUMENTS

| 3,636,185 | A | * | 1/1972 | Ruddell et al. ............... 264/131 |
| 4,113,918 | A | * | 9/1978 | Kogure et al. ............... 428/412 |
| 5,374,662 | A |  | 12/1994 | Lai et al. |
| 5,408,010 | A |  | 4/1995 | May |
| 5,427,859 | A |  | 6/1995 | May |
| 5,869,695 | A |  | 2/1999 | Ulmer et al. |
| 5,886,194 | A |  | 3/1999 | Ulmer et al. |
| 2004/0042989 | A1 |  | 3/2004 | Ulmer et al. |
| 2004/0242822 | A1 |  | 12/2004 | Gawrisch et al. |

FOREIGN PATENT DOCUMENTS

| DE | 19805432 | 3/1999 |
| JP | 1993-230000 A | 9/1993 |
| JP | 57149557 | 9/1993 |
| JP | 1995-118339 A | 5/1995 |

* cited by examiner

*Primary Examiner*—Lorna M Douyon
*Assistant Examiner*—Amina Khan

(57) ABSTRACT

A composition which provides stain resistance and soil resistance to substrates comprising a copolymer of Formula 1

Formula 1

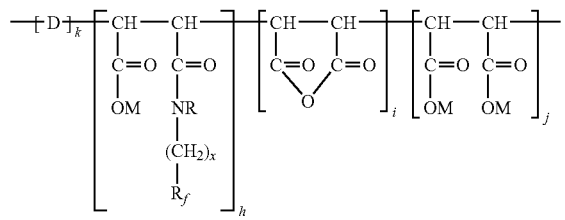

is disclosed, wherein D, M, R, $R_f$, x, k, h, i and j are defined as in claim 1.

4 Claims, No Drawings

PERFLUOROAMIDATED AND HYDROLYZED MALEIC ANHYDRIDE COPOLYMERS

This is a divisional application of Ser. No. 11/115,533, filed Apr. 27, 2005, now abandoned.

BACKGROUND OF THE INVENTION

Polyamide, silk, and wool fibers are subject to soiling and staining. Many of the currently used soil resist agents for nylon carpets are based on polymers derived from perfluoroalkylethyl alcohols. While these fluorochemical soil resist agents are effective in protecting the fiber from soil, they offer little protection from stains caused by acid dyes. Sulfonated aromatic condensates provide stain resistance and durability towards washing or shampooing of polyamide and wool fibers to acid dyes, but they have a tendency to turn yellow over time and accelerate soiling. These stain resists are usually applied from aqueous medium. Often surfactants are used to help disperse or dissolve the stain resist agents at low pH. Co-application of the distinct stain resists and soil resists can pose problems, such as incompatibilities and deficiencies in performance. Because of this incompatibility of soil and stain resists at low pH values in solution, their co-application is not usually viable.

While the performances of stain resistant compositions have been improved, none of the commercial stain resists offer acceptable protection from soiling. Thus improvement in soiling still requires treatment with fluorochemical-based compounds in a separate step.

While both stain and soil resistance have been claimed for single compositions, these typically have not provided the level of stain and soil resistance desired. None provide a superior soil and stain resist performance. May, in U.S. Pat. No. 5,408,010, discloses the reaction of terminally unsaturated alkenylamines or alkenyl alcohols (e.g., allyl amine or alcohol) with maleic anhydride copolymers, and reacting the resulting polymeric amides or esters with 1-iodoperfluoroalkanes. Dehydroiodination of the resulting product provided a polymer in which the perfluoroalkyl groups were linked to the amide through an unsaturated alkenyl group. May does not teach a stain resist property.

It is desirable to provide a single composition that provides superior stain and soil resistance in a single step application process. The present invention provides such a composition and a process for its application.

SUMMARY OF THE INVENTION

The present invention comprises a composition comprising the copolymer of monomers of Formula 1

Formula 1

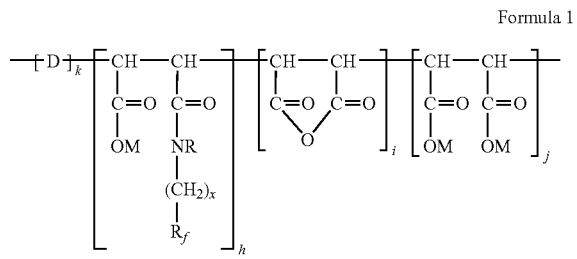

wherein

D is at least one vinyl monomer selected from the group consisting of aryl olefin, vinyl ether, allyl ether, alpha olefin and diene, each M is independently H, $NH_4$, Ca, Mg, Al, or a Group I metal, R is H, a $C_1$-$C_{16}$ alkyl group, or an arylalkyl group, $R_f$ is a fully fluorinated straight or branched $C_2$ to $C_{20}$ aliphatic radical, or mixture thereof, which is optionally interrupted by at least one oxygen atom, x is 1 to about 10, or a mixture thereof, k and h are each independently a positive integer, i and j are each independently zero or a positive integer, provided that i and j are not both simultaneously zero, the molar ratio of k to (h+i+j) is from about 3:1 to about 1:3, and the molar ratio of h to (i+j) is from about 1:99 to about 22:78.

The present invention further comprises a method of providing stain resistance and soil resistance to substrates comprising application in a single step to said substrate of the composition of Formula 1 as described above wherein i and j are each a positive integer, or wherein i is zero and j is a positive integer.

The present invention further comprises a substrate to which has been applied a composition of Formula 1 as described above wherein i and j are each a positive integer, or wherein i is zero and j is a positive integer.

DETAILED DESCRIPTION

Herein trade names are shown in upper case.

The terms "parts per million" or "ppm" as used herein mean micrograms per gram.

The present invention comprises a perfluoroalkylalkylamidated copolymer comprised of the monomers of Formula 1.

Formula 1

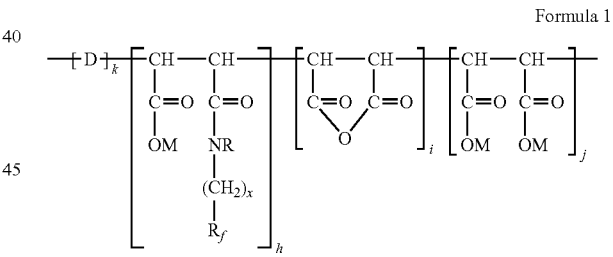

wherein

D is at least one vinyl monomer selected from the group consisting of aryl olefin, vinyl ether, allyl ether, alpha olefin, and diene;

each M is independently H, $NH_4$, Ca, Mg, Al, or a Group I metal;

R is H, a $C_1$ to $C_{10}$ alkyl group, or an arylalkyl group such as benzyl;

x is 1 to about 10 or a mixture thereof, and preferably is from about 2 to about 3;

$R_f$ is a fully fluorinated straight or branched $C_2$ to $C_{20}$ aliphatic radical or mixture thereof that is optionally interrupted by at least one oxygen atom;

k and h are each independently a positive integer;

i and j are each independently zero or a positive integer, provided that i and j are not both simultaneously zero;

the molar ratio of k to (h+i+j) is from about 3:1 to about 1:3; and the molar ratio of h to (i+j) is from about 1:99 to about 22:78.

Formula 1 is schematic of the copolymer and indicates the monomers but not the sequence of monomers in the chain.

The ratio of h to (i+j) is from about 1:99 to about 22:78, preferably from about 5:95 to about 20:80, more preferably from about 10:90 to about 20:80. The molar amount of the N-(perfluoroalkylethyl)amine present is from about 1% to about 22%, preferably about 5% to about 20%, more preferably about 10% to about 20% per mole of maleic group. "Maleic group" includes all the original maleic anhydride in the initial polymer before any reaction with the amine; i.e., (h+i+j).

The sum (h+k+i+j) is sufficient to provide a copolymer molecular weight of at least 800, preferably at least 1000, and more preferably at least 4000. Formula 1 is the reaction product of a maleic anhydride copolymer stain resist precursor with at least one N-(perfluoroalkylalkyl)amine. Typically, the amidation reaction is incomplete, thus (i+j) is greater than 0.

For Formula 1 group M is independently H, a Group I metal, ammonium, $Ca^{2+}$, $Mg^{2+}$, $Al^{3+}$, or other cation. Preferably M is H or a Group I metal, preferably Na or K. More preferable in the Hydrolyzed Formula 1, for the monomer which occurs j times, is for one M to be H and the other Na or K. The ratio of M to H will vary based on the hydrolysis medium and the pH. Preferred for use in the present invention and for application to the substrate are copolymers of Formula 1 that are at least 75% and preferably at least 95% hydrolyzed.

For Formula 1, group D, a preferred example of an aryl olefin is styrene. Preferred examples of allyl or vinyl ethers are $C_4$ to $C_{12}$ alkylvinyl ethers or arylvinyl ethers. A more preferred vinyl ether is butylvinyl ether. A more preferred allyl ether is phenyl allyl ether. A preferred example of an alpha-olefin is 1-octene, and a preferred example of a diene is 1,3-butadiene.

Formula 1 copolymers are prepared by the sequential reaction of a maleic anhydride copolymer starting material,

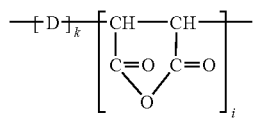

with at least one N-(perfluoroalkylalkyl)amine followed by hydrolysis. The initial reaction with the amine results in the following intermediate

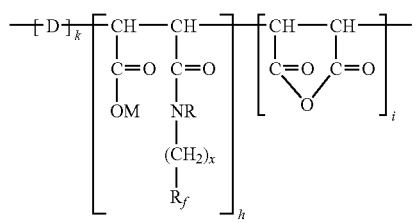

The hydrolysis of this intermediate results in Formula 1.

The maleic anhydride copolymer starting materials useful in the preparation of the copolymers of Formula 1 are copolymers of at least one vinyl monomer and maleic anhydride, and are well known by those skilled in the art. These maleic anhydride copolymers have the general structure of Formula 1 having h and j equal to zero. Examples of such copolymers are described together with methods for their preparation, for instance, by Fitzgerald, et al. in U.S. Pat. No. 4,883,839 and Pechhold in U.S. Pat. Nos. 5,346,726 and 5,707,708. Other methods for their preparation include solvent-free microwave-heated reaction, in an autoclave under high pressure conditions, and by melt extrusion.

The N-(perfluoroalkylalkyl)amines useful in the preparation of the copolymers of Formula 1 are of the structure of Formula 2:

$$R_f\text{—}(CH_2)_x NRH \qquad \text{Formula 2}$$

wherein $R_f$, x, and R are as defined above for Formula 1.

N-(perfluoroalkylethyl)amines useful in the practice of the present invention are prepared by conventional procedures well known to those skilled in the art. For example, N-(perfluoroalkylethyl)amines are prepared by reacting perfluoroalkylethyl iodides in the presence of tetrabutylammonium bromide with sodium azide to form the perfluoroalkylethyl azide followed by catalytic hydrogenation in an inert solvent to yield the N-(perfluoroalkylethyl)amines For example, N-(perfluorohexylethyl)amine is prepared from perfluorohexylethyl iodide.

Alternatively, N-(perfluoroalkylpropyl)amines are prepared by elimination of hydrogen iodide from the perfluoroalkylethyl iodides to yield the perfluoroalkylethylenes, followed by addition of HCN to form the perfluoroalkylpropionitrile. Catalytic hydrogenation of the nitrile yields the N-(perfluoroalkylpropyl)amine. Various perfluoroalkylpropyl iodides, suitable for the preparation of N-(perfluoroalkylpropyl)amines, are also available from Fluorous Technologies Inc., Pittsburgh, Pa. N-(perfluorohexylmethyl)amine is available from Fluorochem Ltd, Old Glossop, UK. The N-(perfluoroalkylalkyl) amine is preferably a mixture of homologs of Formula 2.

The perfluoroalkylalkyl amidated copolymers of Formula 1 of the present invention are prepared by reacting the maleic anhydride copolymer, for example, a solution of the 1-octene/maleic anhydride copolymer, with at least one N-(perfluoroalkylalkyl)amine of the structure of Formula 2. Preferred N-(perfluoroalkylalkyl)amines are N-(perfluoroalkylethyl) amines with the structure $R_f CH_2 CH_2 NH_2$ where $R_f$ is $F(CF_2 CF_2)_n$, n is 1-10 and preferably 2-8.

Mixtures of N-(perfluoroalkylethyl)amines are preferred. Particularly preferred are mixtures prepared from perfluoroalkylethyl iodide mixtures having the compositions shown in Table 1.

TABLE 1

| Perfluoroalkylethyl iodide | Composition by weight | | | |
| --- | --- | --- | --- | --- |
| | Mixture 1 | Mixture 2 | Mixture 3 | Mixture 4 |
| F—$(CF_2CF_2)_2$—$CH_2CH_2I$ | 0.3 | 0.7 | 0.4 | — |
| F—$(CF_2CF_2)_3$—$CH_2CH_2I$ | 56.1 | 44.9 | 31.0 | 1.8 |
| F—$(CF_2CF_2)_4$—$CH_2CH_2I$ | 33.4 | 29.3 | 30.4 | 49.6 |
| F—$(CF_2CF_2)_5$—$CH_2CH_2I$ | 7.1 | 13.3 | 18.3 | 28.0 |
| F—$(CF_2CF_2)_6$—$CH_2CH_2I$ | 1.0 | 4.7 | 9.4 | 11.5 |
| F—$(CF_2CF_2)_7$—$CH_2CH_2I$ | 0.1 | 1.5 | 3.9 | 3.3 |
| F—$(CF_2CF_2)_8$—$CH_2CH_2I$ | — | 0.4 | 1.5 | 1.0 |
| F—$(CF_2CF_2)_9$—$CH_2CH_2I$ | — | 0.0 | 0.5 | 0.2 |
| Average MW | 408 | 422 | 468 | 507 |

Suitable solvents are organic solvents that are inert to the reaction conditions, such as ketones. Methylisobutyl ketone (MIBK) is a preferred solvent based on boiling point and easy subsequent removal. The molar amount of the N-(perfluoroalkylethyl)amine used is from about 1% to about 99%, preferably about 1% to about 80%, more preferably from about 5% to about 30% and more preferably from about 10% to about 20% per mole of anhydride group. The reaction is conducted at a temperature of from about 25° C. to about 120° C. until the N-(perfluoroalkylethyl)amine content is no longer detectable by gas chromatography. In a typical example, MIBK is used as the solvent and a combination of 90° C. and 4 hours is sufficient to complete the reaction. The reaction mass is then treated with a slight excess of an aqueous solution of a base, such as a 10% aqueous sodium hydroxide solution. The MIBK is removed as the MIBK/water azeotrope by distillation at about 400 mm Hg (about 50 kPa) and 80° C. The final aqueous solution is adjusted to give a solution containing from about 20% to about 35% solids and a fluorine content of from about 0.1% to about 2.0%.

Complete hydrolysis of the perfluoroalkylalkylamidated copolymer intermediate gives the hydrolyzed soil resist and stain resist copolymer of Formula 1 wherein i is zero. Formula 1 wherein i is zero and j is a positive integer is referred to herein as "Hydrolyzed Formula 1".

Partial hydrolysis of the perfluoroalkylalkylamidated copolymer intermediate gives the partially hydrolyzed soil resist and stain resist copolymer of Formula 1 wherein i and j are each independently a positive integer. Formula 1 wherein i and j are each independently a positive integer is referred to herein as "Partially Hydrolyzed Formula 1".

Formula 1 wherein j is zero is referred to herein as "Unhydrolyzed Formula 1." For Hydrolyzed Formula 1 and Partially Hydrolyzed Formula 1, j cannot be zero.

Hydrolyzed Formula 1 or Partially Hydrolyzed Formula 1 is the composition of the present invention that is applied to a substrate to provide superior stain and soil resistance.

The compositions of Formula 1 of the present invention are prepared as either dispersions or solutions in water, since water solubility depends on both the fluorine content and pH. Water solubility is decreased as the fluorine content increases. Lower pH values, such as a pH less than 4, also decreases water solubility. Procedures for application are the same for dispersions or solutions.

Conventional additives can be added to the dispersions or solutions of the compositions of Formula 1 of the present invention, such as at least one of stain and soil resists, water and oil repellants, antistatic and antimicrobial agents, anionic and non-ionic surfactants, softeners, antioxidants, light and color fastness agents, and water.

The present invention further comprises a method of providing soil resistance and stain resistance to a substrate, comprising application to the substrate of a composition of Hydrolyzed Formula 1 or Partially Hydrolyzed Formula 1 as described above. Hydrolyzed Formula 1 is equal to Formula 1 wherein i is zero and j is a positive integer, and Partially Hydrolyzed Formula 1 is equal to Formula 1 wherein i and j are each independently a positive integer. The dispersions or solutions of the present invention are applied conventionally to a substrate. Suitable substrates include fibrous substrates and hard surface substrates.

Application methods for fibrous substrates include spray, foam, flex-nip, pad, kiss-roll, beck, skein, and winch. All these application methods are optionally used with heat and with humidity in the range of dry to saturated steam (100% relative humidity). In alternative embodiments of the present invention nip (dip and squeeze), liquid injection, overflow flood, and other application methods well known to those skilled in the art are used. For application to a carpet substrate, the "wet pick up" is the amount of the dispersion or solution of the present invention applied to the pre-wetted carpet, based on the dry weight of the carpet. A low wet pickup bath system can be interchanged with low wet pickup spray or foam systems, and a high wet pickup bath system can be interchanged with other high wet pickup systems, e.g., flex-nip system, foam, pad, or flood. The method employed determines the appropriate wet pickup and whether the application is made from one side of the carpet (spray and foam applications) or both sides (flex-nip and pad). The following Table 2 provides typical process specifications for application to carpet substrates.

TABLE 2

| Application | Typical Wet Pickup Range (%) | Preferred Wet Pickup Range (%) |
|---|---|---|
| Stain resists | | |
| Flex-nip | 150-350 | 200-300 |
| Flood | 100-500 | 200-300 |
| Foam | 20-200 | 50-150 |
| Pad | 100-500 | 200-300 |
| Spray | 20-200 | 50-150 |
| Fluorochemical soil resists | | |
| Foam | 5-50 | 10-15 |
| Spray | 5-50 | 10-15 |

Many variations of the conditions for spray, foam, flex-nip, flood, and pad applications are well known to those skilled in the art and the preceding conditions are provided as examples and not are intended to be exclusive.

A typical application utilizes a dispersion or solution of the present invention having about 8.6% solids and a fluorine content of about 0.34%. The dispersion or solution of the present invention is applied to a pre-wetted carpet at a wet pick up of from about 20% to about 60%, dried at from about 150° F. to about 180° F. (66° C. to 82° C.) and preferably cured at from about 250° F. to about 300° F. (121° C. to 149° C.). Alternatively, the treated carpet can be air-dried, but this not preferred. To pre-wet the carpet, the carpet is soaked in water and the excess water suctioned off. The "wet pick up" is the amount of the dispersion or solution of the present invention applied to the prewetted carpet based on the dry weight of the carpet. After drying, the treated carpet preferably contains about 100 ppm to about 1000 ppm fluorine (about 100 to about 1000 microg/g fluorine) based on the weight of the dried carpet.

For the application of the dispersions or solutions of the present invention to hard surfaces, the dispersion or solution of the present invention may optionally further comprise up to 10% by weight but preferably not more than 3% by weight of one or more water-miscible organic solvents such as alcohols, ketones and esters to improve penetration, drying and the stability of the emulsion. Examples include ethanol, methylisobutylketone and isopropyllactate. Organic solvents in the mixtures are preferably kept at a minimum for health, safety, pollution, and ecological reasons.

The dispersion or solution is diluted until the percent total fluorine in the dispersion or solution, based on the weight of the dispersion or solution, is from about 0.25% to about 7.5%, preferably from about 1% to about 6.8% by weight, and most preferably from about 2.5% to about 6.5% by weight.

The composition of the present invention, at an application concentration containing total fluorine as described above, is applied to the substrate surface by conventional means, including but not limited to, brush, spray, roller, doctor blade, wipe, immersion, and dip techniques. Preferably a first coating is followed by at least one additional coat using a wet-on-wet technique. More porous substrates may require subsequent additional coats. The wet-on-wet procedure comprises applying a first coat which is allowed to soak into the substrate but not dry (e.g., for about 10-30 minutes) and then applying a second coat. Any subsequent coats are applied using the same technique as described for the second coat. The substrate surface is then allowed to dry under ambient conditions, or the drying can be accelerated by warm air if desired. The wet-on-wet application procedure provides a means to distribute or build up more of the protective coating at the substrate surface. A wet-on-wet application is preferred since, if the previous coat is allowed to dry, it tends to repel subsequent coats. For porous substrates, the coats should saturate the substrate surface.

The present invention further comprises a substrate to which has been applied a composition of Hydrolyzed Formula 1 or Partially Hydrolyzed Formula 1 as defined above. Hydrolyzed Formula 1 is equal to Formula 1 wherein i is zero and j is a positive integer, and Partially Hydrolyzed Formula 1 is Formula 1 wherein i and j are each independently a positive integer. Substrates suitable for use herein include fibrous substrates and hard surface substrates. Suitable fibrous substrates include fiber, fabric, textiles, carpet, and leather. These substrates are natural or synthetic or blends thereof. Natural fibers include wool, cotton, jute, sisal, sea grass, coir and blends thereof. Synthetic fibers include polyamides, polyaramids, polyesters, polyolefins, acrylics, and blends thereof.

In another embodiment, the dispersions or solutions of the present invention are useful for treatment of hard surface substrates, including porous mineral surfaces, such as stone, masonry, concrete, unglazed tile, brick, porous clay and various other substrates with surface porosity. Specific examples of such substrates include unglazed concrete, brick, tile, stone (including granite and limestone), grout, mortar, marble, limestone, statuary, monuments, wood composite materials such as terrazzo, and wall and ceiling panels including those fabricated with gypsum board. These are used in the construction of buildings, roads, parking ramps, driveways, floorings, fireplaces, fireplace hearths, counter tops, and other decorative uses in interior and exterior applications.

The treated substrates of the present invention have superior stain and soil resistance. These properties have been achieved via a single step application of the composition of Hydrolyzed Formula 1 or Partially Hydrolyzed Formula 1 of the present invention. The present invention provides superior stain resistance and soil resistance to substrates in an efficient one-step application of the compositions defined herein.

Materials and Test Methods

The following materials are used in the Examples herein.

Laboratory chemicals including tetrabutylammonium bromide, sodium azide, polystyrene-co-maleic anhydride), and allyl phenyl ether are available from laboratory chemical suppliers, for instance Aldrich, Milwaukee Wis.

The preparation of poly(styrene-co-maleic anhydride) and poly(1-octene-co-maleic anhydride) is described in U.S. Pat. Nos. 4,883,839; 5,346,726; and 5,708,087.

Mixtures of perfluoroalkylethyl iodides as shown in Table 1 are available from E.I. du Pont de Nemours and Company, Wilmington Del.

Carpet Material. The carpet material used was a commercial level loop (LL) 1245 denier, 1/10 gauge (0.1 inch or 2.5 mm tuft separation), 26 oz/yd$^2$ (0.88 kg/m$^2$), dyed pale yellow and available from Invista Inc., Wilmington Del.

Test Method 1

Carpet samples, 6.76×6.76-inch (17.2×17.2 cm) squares of dyed carpet, were cut and placed pile side up on a non-absorbent surface. The pile was cleaned of any unattached materials by vacuuming. ORIGINAL MAXWELL HOUSE ground coffee (33.8 g), available from Maxwell House Coffee Co., Tarrytown N.Y. was placed into a standard 10-cup coffee filter. Deionized water (1266.2 g) was added and the coffee brewed according to the manufacturers' directions. The pH of the coffee was adjusted to 5.0 using aqueous solutions containing either 30% aqueous sodium hydrogen sulfate or 10% sodium hydroxide as needed. The coffee was poured into a suitable volumetric dispenser, capable of dispensing 50 mL portions and the dispenser placed in the hot water bath at 62° C. The coffee was allowed to come to a temperature 140° F.+/−5° F. (60°+/−2.8° C.) and remain at that temperature for 30+/−5 minutes prior to staining. A ring, in the shape of an open-ended cylinder or inverted frustum was used, having a diameter of the smaller opening of 2.75 inch (7 cm). Such a ring is described for a different purpose in AATCC Test Method 175-1993. The ring was placed at the center of the carpet sample, with the smaller diameter opening against the pile. The coffee dispenser was set to measure 50 mL, and purged once prior to staining. With the ring pressed down into the pile, 50 mL of coffee was transferred into a container and immediately poured into the ring and onto the carpet. The coffee was worked into the carpet evenly and thoroughly with the base of the cup. The coffee was allowed to stain the carpet for 4 hours+/−20 minutes.

Test Method 2

Hot water extraction cleaning of carpet samples was performed according to the American Association of Textile Chemists and Colorists (AATCC) Test Method #171 "Cleaning of Carpets: Hot Water (Steam) Extraction Method", except that no detergent was used.

Test Method 3

A Minolta Chroma Meter CR-210 colorimeter (Minolta Corporation, Ramsey N.J.) was used to grade the stained carpet samples, compared against a control (unstained) carpet to measure the color difference ("Delta E" value). Any unattached materials were removed from the pile prior to grading. Details for measuring the Delta E are provided in the AATCC test method #153 "Color Measurements for Textiles: Instrumental". The test was repeated as necessary for different carpet colors, constructions and styles. The Delta E value measures the difference in color between two samples and is more sensitive than the human eye. The average person can distinguish between the colors of two objects with a Delta E measurement of 1.0 or more. The initial color of the carpet (L*, a*, b*) was measured in an unstained or unsoiled area of the carpet. The Delta E measured the difference in color between this spot and the subsequent stained or soiled area. A Delta E value of zero represents no color difference between two samples. A larger Delta E value indicates a larger color difference between two samples. Test Method 3 (Delta E) was used to measure both coffee staining and soiling.

Test Method 4. Accelerated Soiling Drum Test.

Carpet specimens were mounted onto the inside of a metal drum with the pile toward the center of the drum, using either 2-sided adhesive tape and/or mechanical clamps, until the inside surface was completely covered by carpet. Different metal drums have been used for assessing accelerated carpet mechanical wear. Many of these metal drums have been adapted for assessing accelerated carpet soiling. Two units that have been widely adapted are the Hexapod drum and the Vetterman drum. By scaling the amount of carpet, soil, and soiling time, comparable accelerated soiling results can be obtained in many different metal drum units.

| Metal Drum Unit | Hexapod | Vetterman |
|---|---|---|
| Internal drum diameter | 8 inches (20.3 cm) | 31.25 inches (79.4 cm) |
| Internal drum depth | 3.5 inches (8.9 cm) | 10.5 inches (26.7 cm) |
| Dirty resin pellets | 250 mL | 1000 mL |
| Soiling time | 3 min. | 45 min. |

Into the drum was then placed a volume of "dirty SURLYN ionomer resin pellets" and 250 mL volume of 5/16 inch (0.79 cm) ball bearings. "Dirty SURLYN ionomer resin pellets" are made by blending 1 L SURLYN 8528 ionomer resin pellets with 20 g of synthetic soil (AATCC Method 123-1988). SURLYN 8528 ionomer is an ethylene/methacrylic acid copolymer, partial sodium or zinc salt, and is available from E.I. du Pont de Nemours and Company, Wilmington, Del. The drum was then closed and rolled on a roller-type drum mill for a few minutes. The carpet samples were then removed from the drum and cleaned with a canister-type vacuum cleaner. The degree of soiling was measured with a Minolta Chroma Meter CR 200 by determining the difference in darkness as "Delta E" between the unsoiled control and the soiled carpet sample. Values of "E" are measured according to the manufacturer's directions. A "Delta E" unit of 1 is significant when compared to visual evaluation. The lower the "Delta E" value, the lower the soiling.

Examples

Example 1

Perfluoroalkylethyl iodide, wherein perfluoroalkyl was $CF_3(CF_2)_n$ and n was 3-15 (1 L) was placed in a 2-L round-bottom flask equipped with a 10-plate column and a distillation head. A vacuum of 50 ton (6.7 kPa) was applied and the solution heated at to a pot temperature of 100°-125° C. A forecut was removed at a head temperature of 52°-71° C., containing predominantly the perfluorobutylethyl iodide fraction, which was discarded. A second fraction (260 g) was collected at 92° C. head temperature and 125° C. bath temperature at 120 torr (16 kPa). Analysis by gas chromatography indicated that the second fraction was 90% perfluorohexylethyl iodide and 10% perfluorooctylethyl iodide.

The predominately perfluorohexylethyl iodide fraction (prepared as above, 109 g, 0.23 mol) was charged to a 1-L round-bottomed flask equipped with a heating mantle, overhead stirrer, reflux condenser, thermometer, and addition funnel. Tetrabutylammonium bromide (3.9 g, 0.012 mol) was added to the solution. Agitation was started and the flask contents heated to 100° C. Sodium azide (22.1 g, 0.34 mol) was added to 68 g water in a separate flask and heated to 75° to 80° C. to dissolve. The aqueous sodium azide solution was added to the flask through the addition funnel over a five-minute period. The reaction mixture was heated with agitation at 100° C. for 8 h, then the organic layer was sampled and disappearance of starting material was checked by gas chromatography. If the staring material was consumed, the organic and aqueous layers were separated, otherwise the reaction was allowed to react for a longer time. The lower organic layer was returned to the flask and extracted with 100-ml portions of hot (60° C.) water three times. The final product, perfluorohexylethyl azide, was then checked for purity by gas chromatography, FTIR, and proton NMR.

Perfluorohexylethylethyl azide (100 g. prepared as above) was dissolved in methylene chloride (250 g) and 5% palladium-on-carbon (2 g, Engelhard ESCAT162 (available from Engelhard Corporation, Seneca S.C.) was added. The solution was pressurized to 400 prig (2860 kPa) with hydrogen in a tubular pressure reactor and the solution was agitated at room temperature for 5 h. The palladium-on-carbon was filtered off to give a pale yellow solution. The methylene chloride was removed on a rotary evaporator to give an oil containing 94% N-(perfluorohexylethyl)amine and 6% N-(perfluorooctylethyl)amine as characterized by proton NMR, FTIR, and gas chromatography.

A solution of 1-octene-maleic anhydride polymer (32 g, 61.5% in methylisobutylketone (MIBK), 0.094 mmol), from E.I. du Pont de Nemours and Company, Wilmington Del., was dissolved in 20.0 g MIBK in a 500-mL round bottomed flask equipped with overhead stirring, a thermocouple, dropping funnel, and a heating mantle. The solution was heated to 90° C. and N-(perfluorohexylethyl)amine (5.5 g, 0.015 mole, prepared as above) was added over five minutes via a dropping funnel. The progress of the formation of the derivative was followed by the disappearance of the N-(perfluorohexylethyl)amine by gas chromatography. After 4 h the amine had disappeared. Sodium hydroxide solution (10%, 33 g) and 250 g of water was added. The MIBK-water azeotrope was removed by vacuum distillation at 400 mm Hg vacuum (about 50 kPa) at 80° C. The final aqueous solution had 8.6% solids and 0.34% F, corresponding to 12 mole % incorporation of $R_fCH_2CH_2NH_2$.

The soil and stain resist performance testing was done by spray application at pH 6-8 on a 1245 LL commercial carpet dyed pale yellow and latex backed carpet. A concentration of 600 ppm (600 mg/kg) fluorine was applied to the carpet, based on the dry carpet (pile) weight, for the soil resist tests. The 4"×4" (10×10 cm) carpet samples were pre-wetted with 3 g water and sprayed with 6.0 g solution (~50% wet pick up). The solution was worked in with a roller and oven dried at about 170° F. (76.7° C.), then cured at 300° F. (149° C.). The colorimetric delta E of the coffee stain resist test showed that 47% of the stain from the brewed coffee (prepared as in Test Method 1) was blocked. This colorimetric delta E compares with controls having a value of −11% blocking obtained with hydrolyzed 1-octene/maleic anhydride polymer and 20% blocking for hydrolyzed styrene/maleic anhydride polymer. The percent blocking of stain is calculated as 100(Delta $E_{untreated}$−Delta $E_{treated}$)/Delta $E_{untreated}$ Soiling was effected by Test Method 4 (Accelerated Drum Test). The resulting data are listed in Table 3.

Example 2

The procedure of Example 1 was repeated and the N-(perfluorohexylethyl)amine was monitored by gas chromatography. The polymer was precipitated after the N-(perfluorohexylethyl)amine had disappeared from the above solution by pouring MIBK solution into a stirred 50:50 toluene:hexane mixture. The precipitated and amine functionalized 1-octene/ maleic anhydride polymer was filtered and dried at 60° C. under vacuum. The solid had 5.5% fluorine by elemental analysis. The IR analysis showed new absorbances at 1720 $cm^{-1}$ and 1200 $cm^{-1}$ indicating amide group and C—F linkages, respectively. The polymer was hydrolyzed in aqueous sodium hydroxide solution, as in Example 1, and applied to carpet and tested for soil and stain resistance as in Example 1. Results are shown in Table 3.

Examples 3-4

1-octene-maleic anhydride polymer was reacted as in Example 1 with various quantities of N-(perfluorohexylethyl)amine in tetrahydrofuran solvent to incorporate various amounts (mole %) of fluorine into the polymer as shown in Table 3 and characterized as in Example 2. These polymers were hydrolyzed as in Example 1 and were tested for soil and stain resist on commercial carpet as in Example 1. Table 3 below gives the results. The control used was unfunctionalized 1-octene-maleic anhydride polymer (OCT-MA) polymer that was subsequently hydrolyzed (denoted as Comparative Example C) in Table 3. The control was tested as in Example 2.

Example 5

Maleic anhydride (15.0 g, 0.15 mole, available from Aldrich Chemicals, Milwaukee Wis.), allyl phenyl ether (21.0 g, 0.16 mole, from Aldrich), and cumene (100 g, from Aldrich) were weighed into a 250-mL round-bottomed flask equipped with a thermocouple, overhead stirring, heating mantle, condenser, and nitrogen purge. The mixture was stirred at room temperature until solution was complete. The solution was heated to 70° C. and purged with nitrogen for 1 h, after which benzoyl peroxide (0.4 g) was added. Additional benzoyl peroxide (0.5 g) was added after 4 h. The reaction mix was then held at 70° C. for 20 h, cooled to room temperature, and the insoluble polymer that had precipitated from the cumene solution was filtered and washed with hexane (200 mL). The filtered solid was dried in a vacuum oven at 70° C. White powder (27.3 g, 75% yield) was recovered. $^1$H NMR showed that the polymer was a 1:1 molar ratio of allyl phenyl ether and maleic anhydride.

The copolymer of allyl phenyl ether and maleic anhydride (3.0 g), prepared as described above, and N-(perfluorohexylethyl)amine (1.1 g) were combined and ground in a mortar with a pestle until the two compounds were thoroughly mixed. This mixture was placed in a 50-mL pyrex beaker on the turntable of a 1000-watt conventional microwave oven (General Electric Model JVM1660WB, General Electric Co., Fairfield Conn.) along with a beaker containing about 800 mL of ambient temperature water. After heating this mixture at HIGH power for 5 min, the warmed water was replaced with about 800 mL of ambient temperature water and the 5 min. microwave heating cycles were repeated until a total of 60 min of microwave heating time was achieved. Thin layer chromatography (TLC) with silica and an ethanol/triethylamine solvent mixture showed the complete disappearance of the N-(perfluorohexylethyl)amine. The polymer was hydrolyzed in aqueous sodium hydroxide solution, as in Example 1, and applied to carpet and tested for soil and stain resistance as in Example 1. Results are shown in Table 3.

Comparative Examples A1 and A2

Comparative Examples A1 and A2 represent replicate controls (wherein the carpet was not treated for soil and stain resistance) to account for minor differences in soiling for two essentially identical carpets. Testing was conducted using Test Methods 1 to 4 as in Example 1. Comparative Examples A1 and A2 are the nylon carpet used in Example 1 without any topical treatments. Test results are shown in Table 3.

Comparative Examples B1/B2

Comparative Examples B1 and B2 represent use of a commercially available soil resist agent. In Comparative Examples B1 and B2, the same carpet as in Example 1 had been treated with Soil Resist 1, a commercially available soil resist agent available from E.I. du Pont de Nemours and Company, Wilmington, Del., using the same application method as in Example 1 at a fluorine concentration of about 600 microg/g based on the dry carpet weight. These comparative examples were tested using Test Methods 1 to 4 as in Example 1. Results are in Table 3 and show that a soil resist agent alone does not provide stain resistance to coffee stains.

Comparative Example C

In Comparative Example C, the carpet was treated using the procedure of Example 3 to 4 with octene-maleic anhydride copolymer, without reaction with N-(perfluoroalkylethyl)amine, and which octene-maleic anhydride copolymer was hydrolyzed (Formula 1 in which h and i are zero). It was tested simultaneously with Examples 3-4 using the test methods as in Example 1. Results are listed in Table 3.

Comparative Examples D, E, and F

In Comparative Example D, the same carpet as in Examples 3-4 was treated using the procedure of Examples 3-4 with styrene-maleic anhydride copolymer, without reaction with N-(perfluoroalkylethyl)amine, which styrene-maleic anhydride copolymer was hydrolyzed (Formula 1 in which h and i are zero). In Comparative Examples E and F, the same carpet as in Examples 3-4 was treated using the procedure of Examples 3-4 with styrene-maleic anhydride polymer which had been reacted with quantities of N-(perfluorohexylethyl)amine in tetrahydrofuran solvent to incorporate the amount (mole %) of fluorine into the polymer as shown in Table 3. The Examples were tested using the test methods as in Example 1. Results are listed in Table 3. Comparative Examples E and F have poorer resistance to coffee compared to Comparative Example D showing that incorporation of higher amounts of $R_fCH_2CH_2NH_2$ is not as effective in the present invention.

TABLE 3

| Ex. # | Stain Resist Polymer (a) | Soil Resist | Mole % $R_f$-$CH_2CH_2NH_2$ incorporation per mole of maleic group | Blocked Coffee Staining (%, Test Methods 1-3) (c) | Soiling Delta E (Test Method 4) (d) |
|---|---|---|---|---|---|
| Comp. Ex. A1 | None | None | None | 0% | 21.4 |
| Comp. Ex. B1 | None | Soil Resist 1 | None | 0% | 13.1 |

TABLE 3-continued

| Ex. # | Stain Resist Polymer (a) | Soil Resist | Mole % $R_f\text{-}CH_2CH_2NH_2$ incorporation per mole of maleic group | Blocked Coffee Staining (%, Test Methods 1-3) (c) | Soiling Delta E (Test Method 4) (d) |
|---|---|---|---|---|---|
| 1 | Oct/MA | None | 10% | 36% | 12.7 |
| 2 | St/MA | None | 12% | 43% | 13.9 |
| Comp. Ex. A2 | None | None | None | 0% | 16.3 |
| Comp. Ex. B2 | None | Soil Resist 1 | None | 0% | 13.8 |
| Comp. Ex. C | Oct/MA | None | 0% | 15% | 11.4 |
| 3 | Oct/MA | None | 17% | 17% | 13.8 |
| 4 | Oct/MA | None | 22% | 22% | 12.2 |
| Comp. Ex. D | St/MA | None | 0% | 17% | 14.0 |
| Comp. Ex. E | St/MA | None | 25% | 11% | 12.0 |
| Comp. Ex. F | St/MA | None | 65% | 4% | 13.4 |
| 5 | APE/MA | None | 20% | 33% | NT (b) |

(a) Oct/MA is poly(1-octene-co-maleic anhydride), St/MA is poly(styrene-co-maleic anhydride). APE/MA is poly (allyl phenyl ether-co-maleic anhydride).
(b) NT means not tested. Different test sets are separated by heavy lines.
(c) For Blocked Coffee Soiling a higher percentage indicates superior performance.
(d) For Soiling Delta E a lower number indicates superior performance.

Table 3 demonstrates that the composition of the present invention provides both stain resistance and soil resistance by application of a single composition to the substrate. Traditional stain resist agents and soil resist agents provide either superior stain resistance or superior soil resistance, but usually not both simultaneously. Table 3 indicates the composition of the invention showed superior coffee stain resistance with comparable or improved soil resistance when compared to a prior art soil resist agent. This is shown by comparing Examples 1 and 2 versus Comparative Examples A1 (control) and B1 (traditional soil resist), and by comparing Examples 3 and 4 versus Comparative Examples A2 (control) and B2 (traditional soil resist). Table 3 also indicates that the composition of the invention showed comparable soil resistance with improved stain resistance when compared to a prior art stain resist agent. This is shown by comparing Examples 3 and 4 versus Comparative Example C (traditional stain resist). Comparative Examples E and F versus Comparative Example D (traditional stain resist) show that incorporation of higher levels of $R_f\text{---}CH_2CH_2NH_2$ is not as effective. Example 5 shows the coffee stain blocking is effective with use of a poly(allyl phenyl ether-co-maleic anhydride) with incorporated $R_f\text{---}CH_2CH_2NH_2$.

What is claimed is:

1. A method of providing stain resistance and soil resistance to a pre-wetted carpet comprising application in a single step to said pre-wetted carpet of the composition of Formula 1

Formula 1

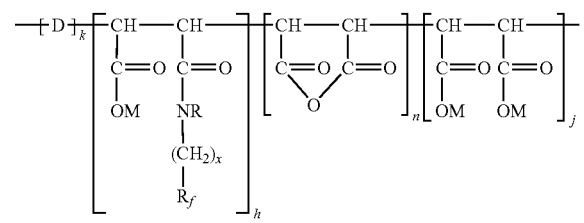

wherein

D is at least one vinyl monomer selected from the group consisting of aryl olefin, vinyl ether, allyl ether, alpha olefin and diene;

each M is independently H, $NH_4$, Ca, Mg, Al, or a Group I metal;

R is H, a $C_1$-$C_{16}$ alkyl group, or an arylalkyl group;

$R_f$ is a fully fluorinated straight or branched $C_2$ to $C_{20}$ aliphatic radical, or mixture thereof, which is optionally interrupted by at least one oxygen atom;

x is 1 to about 10, or a mixture thereof;

k and h are each independently a positive integer;

i and j are each independently a positive integer, or i is zero and j is a positive integer;

such that the molar ratio of k to (h+i+j) is from about 3:1 to about 1:3, and the molar ratio of h to (i+j) is from about 1:99 to about 22:78;

wherein said composition is applied as an aqueous dispersion or solution which is applied to said pre-wetted carpet at a wet pick up of from about 20% to about 60%;

further comprising the steps of drying said pre-wetted carpet at from about 150° F. to about 180° F. and curing said pre-wetted carpet at from about 250° F. to about 300° F.

2. The method of claim 1 wherein the composition is applied by means of exhaustion, spray, foam, flex-nip, nip, pad, kiss-roll, beck, skein, winch, liquid injection, overflow flood, brush, roll, spray or immersion.

3. The method of claim 1 wherein the composition is applied in the presence of a surfactant, stain resist agent, soil resist agent, water repellent, oil repellent, antistatic agent, antimicrobial agent, softener, antioxidant, light fastness agent, color fastness agent, or water.

4. A pre-wetted carpet to which has been applied a composition of Formula 1

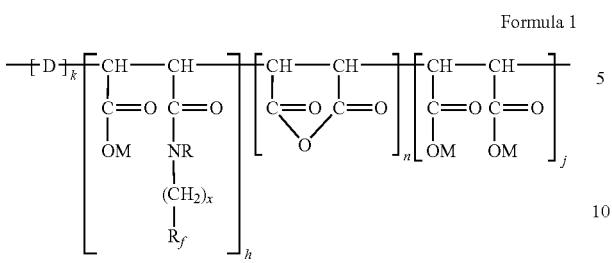

Formula 1 wherein
D is at least one vinyl monomer selected from the group consisting of aryl olefin, vinyl ether, allyl ether, alpha olefin and diene;
each M is independently H, $NH_4$, Ca, Mg, Al, or a Group I metal;
R is H, a $C_1$-$C_{16}$ alkyl group, or an arylalkyl group;
$R_f$ is a fully fluorinated straight or branched $C_2$ to $C_{20}$ aliphatic radical, or mixture thereof, which is optionally interrupted by at least one oxygen atom;
x is 1 to about 10, or a mixture thereof;
k and h are each independently a positive integer;
i and j are each independently a positive integer, or i is zero and j is a positive integer;
the molar ratio of k to (h+i+j) is from about 3:1 to about 1:3, and the molar ratio of h to (i+j) is from about 1:99 to about 22:78;
said composition applied as an aqueous dispersion at a wet pick up of from about 20% to about 60%; and
wherein said pre-wetted carpet is dried at from about 150° F. to about 180° F. and cured at from about 250° F. to about 300° F.

\* \* \* \* \*